(12) United States Patent
Oku

(10) Patent No.: US 11,668,952 B2
(45) Date of Patent: Jun. 6, 2023

(54) VOLUMETRIC DISPLAY

(71) Applicant: National University Corporation Gunma University, Gunma (JP)

(72) Inventor: Hiromasa Oku, Gunma (JP)

(73) Assignee: National University Corporation Gunma University, Gunma (JP)

( * ) Notice: Subject to any disclaimer, the term of this patent is extended or adjusted under 35 U.S.C. 154(b) by 0 days.

(21) Appl. No.: 17/640,746

(22) PCT Filed: Aug. 31, 2020

(86) PCT No.: PCT/JP2020/032814
§ 371 (c)(1),
(2) Date: Mar. 4, 2022

(87) PCT Pub. No.: WO2021/044990
PCT Pub. Date: Mar. 11, 2021

(65) Prior Publication Data
US 2022/0342231 A1 Oct. 27, 2022

(30) Foreign Application Priority Data
Sep. 6, 2019 (JP) .............................. JP2019-162573

(51) Int. Cl.
*G02B 30/50* (2020.01)
*H04N 13/388* (2018.01)
(Continued)

(52) U.S. Cl.
CPC ............. *G02B 30/50* (2020.01); *G02F 1/294* (2021.01); *G02F 1/33* (2013.01); *G03B 21/008* (2013.01);
(Continued)

(58) Field of Classification Search
CPC ........ G02B 3/14; G02B 3/0087; G02B 30/50; G02B 30/56; H04N 13/365; H04N 13/388; G02F 1/294; G02F 1/33; G03B 21/008
See application file for complete search history.

(56) References Cited

U.S. PATENT DOCUMENTS

2007/0247595 A1   10/2007   Refai et al.
2016/0147078 A1   5/2016    Bedard et al.
(Continued)

FOREIGN PATENT DOCUMENTS

JP     2004-163644 A   6/2004
JP     2009-535665 A   10/2009
(Continued)

OTHER PUBLICATIONS

Mermillod-Blondin, A. et al., "High-speed varifocal imaging with a tunable acoustic gradient index of refraction lens," Optics Letters, vol. 33, No. 18, Sep. 15, 2008, pp. 2146-2148.
(Continued)

*Primary Examiner* — Ryan D Howard
(74) *Attorney, Agent, or Firm* — Seed Intellectual Property Law Group LLP

(57) ABSTRACT

A volumetric display capable of high-speed image presentation includes a resonance-type liquid lens having a focal length that is periodically adjusted using resonance of a liquid. An image projector projects an image toward a viewpoint position of a user via the resonance-type liquid lens. Further, the image projector projects an image toward the viewpoint position within a shorter time period than one-tenth of a variation cycle of the focal length. The image projector includes an LED and a DMD, for example.

5 Claims, 2 Drawing Sheets

(51) Int. Cl.

| | | |
|---|---|---|
| H04N 13/365 | (2018.01) | |
| H04N 13/398 | (2018.01) | |
| G02F 1/29 | (2006.01) | |
| G02F 1/33 | (2006.01) | |
| G03B 21/00 | (2006.01) | |
| G03B 21/20 | (2006.01) | |

(52) U.S. Cl.
CPC ....... *G03B 21/2033* (2013.01); *H04N 13/365* (2018.05); *H04N 13/388* (2018.05); *H04N 13/398* (2018.05)

(56) References Cited

U.S. PATENT DOCUMENTS

| | | |
|---|---|---|
| 2017/0184848 A1 | 6/2017 | Vallius |
| 2017/0301313 A1 | 10/2017 | Perreault |

FOREIGN PATENT DOCUMENTS

| | | |
|---|---|---|
| JP | 2016-99631 A | 5/2016 |
| WO | 2014/062912 A1 | 4/2014 |
| WO | 2017/112084 A1 | 6/2017 |

OTHER PUBLICATIONS

Liu, S. et al., "A Novel Prototype for an Optical See-Through Head-Mounted Display with Addressable Focus Cues," IEEE Transactions on Visualization and Computer Graphics, vol. 16, No. 3, May 2010, pp. 381-393.

Okumura, K. et al., "Lumipen: Projection-Based Mixed Reality for Dynamic Objects," 2012 IEEE International Conference on Multimedia and Expo (ICME 2012), 2012, pp. 699-704.

Jota, R. et al., "How Fast is Fast Enough? A Study of the Effects of Latency in Direct-Touch Pointing Tasks," CHI 2013: Changing Perspectives, Paris, France—CHI 13, Apr. 27-May 2, 2013, pp. 2291-2300.

Maimone, A. et al., "Pinlight Displays: Wide Field of View Augmented Reality Eyeglasses using Defocused Point Light Sources," ACM Transactions on Graphics, vol. 33, No. 4, Jul. 2014, pp. 1-11.

Zheng F. et al., "Minimizing Latency for Augmented Reality Displays: Frames Considered Harmful," IEEE International Symposium on Mixed and Augmented Reality 2014 Science and Technology Proceedings, Sep. 12, 2014, pp. 195-200.

Huang, F.-C. et al., "The Light Field Stereoscope," ACM Transactions on Graphics, vol. 34, No. 4, Article 60, Aug. 2015, pp. 60:1-60:12.

Konrad, R., et al., "Computational Focus-Tunable Near-eye Displays," SIGGRAPH Jul. 24-28, 2016, pp. 1-2.

Itoh, Y. et al., "Laplacian Vision: Augmenting Motion Prediction via Optical See-Through Head-Mounted Displays," AH 2016, Feb. 25-27, 2016, pp. 1-8.

Lincoln, P. et al., "From Motion to Photons in 80 Microseconds: Towards Minimal Latency for Virtual and Augmented Reality," IEEE Transactions on Visualization and Computer Graphics, vol. 22, No. 4, Apr. 2016, pp. 1367-1376.

Maimone, A. et al., "Holographic Near-Eye Displays for Virtual and Augmented Reality," ACM Transactions on Graphics, vol. 36, No. 4, Jul. 2017, pp. 1-16.

Dunn, D. et al., "Wide Field of View Varifocal Near-Eye Display Using See-Through Deformable Membrane Mirrors," IEEE Transactions on Visualization and Computer Graphics, vol. 23, No. 4, 2017, pp. 1275-1284.

Matsuda, N. et al., "Focal Surface Displays," ACM Transactions on Graphics, vol. 36, No. 4, Article 86, Jul. 2017, pp. 1-14.

Narita, G. et al., "Dynamic Projection Mapping onto Deforming Non-Rigid Surface Using Deformable Dot Cluster Marker," IEEE Transactions on Visualization and Computer Graphics, vol. 23, No. 3, Mar. 2017, pp. 1235-1248.

Chang, J.-H. R., et al., "Towards Multifocal Displays with Dense Focal Stacks," ACM Trans. Graph., vol. 37, No. 6, Article 198, Nov. 2018, 198:1-198:13.

Ueno, T. et al., "Super multi-view near-eye display to solve vergence-accommodation conflict," Optics Express 30703, vol. 26, No. 23, Nov. 12, 2018, 13 pgs.

Kim, S.-B. et al., "Optical see-through Maxwellian near-to-eye display with an enlarged eyebox," Optics Letters, vol. 43, No. 4, Feb. 15, 2018, pp. 767-770.

Written Opinion of the International Searching Authority for International Application No. PCT/JP2020/032814 dated Nov. 17, 2020, 4 pgs.

International Search Report for PCT/JP2020/032814, dated Nov. 17, 2020, 2 pgs.

VOLUMETRIC DISPLAY

BACKGROUND

Technical Field

The present disclosure relates to a volumetric display.

Description of the Related Art

In response to a recently increased interest in virtual reality (VR) and augmented reality (AR), various head mount displays (HMDs) have been developed, and have attracted attention. Among them, a transmissive HMD may be particularly important for application in the AR or the like because it can present annotation (additional information) superimposed on a real world to a user.

Particularly considering the superimposition of the annotation on a dynamic real world, it is ideal that the display that presents a video image have a high-speed performance of about milliseconds. For example, in a situation where a shift in position due to a delay is easily recognized, like in a touch panel, it is reported that a limit value at which a person does not feel the delay is 2.38 milliseconds (see Non-Patent Literature 1, described below).

Although not an HMD, a technique, in which a high-speed performance is important, referred to as a dynamic projection mapping technique has also been known in a field of projection based mixed reality (MR) or projection mapping that projects information using a projector (see Non-Patent Literatures 2 and 3, described below). Studies have also been conducted on high-speed video image presentation in the HMD, and a method for reducing a delay of video image presentation (see Non-Patent Literatures 4 and 5, described below) and a method using correction by prediction (see Non-Patent Literature 6, described below) have been proposed. The studies presuppose three-dimensional information presentation by a stereo view for presenting different two-dimensional video images on respective eyes.

On the other hand, in the three-dimensional information presentation by the stereo view, it has been known that there exists a vergence accommodation conflict (VAC) as a conflict between focusing and congestion of eyes, and this has been said to be a cause of a fatigue and sickness symptom referred to as so-called 3D sickness. To solve this, not only a parallax but also a clue of a focus needs to be presented to a person. As a solution thereto, a method using a light field (see Non-Patent Literatures 7 and 8, described below), a method using a variable focus lens (see Non-Patent Literatures 9 to 11, described below), a method using a variable half mirror (see Non-Patent Literature 12, described below), a method using a hologram (see Non-Patent Literature 13, described below), and a method using wavefront control by an SLM (special light modulator) (see Non-Patent Literature 14, described below), and the like have been proposed. The method using the light field has a problem that an eye box decreases. However, a method by an SMV (super multi-view) for implementing a relatively wide eye box while taking a configuration close to this method (see Non-Patent Literature 15, described below) has also been proposed. As an approach to eliminate an effect of focusing of a person, there exists a method that implements a wide eye box by a deep DOF (depth of focus) and HOE (holographic optical element) by a Maxwell view (see Non-Patent Literature 16, described below), for example.

However, generally in a display system for reducing a VAC, a light ray field that matches focusing needs to be presented. Thus, it tends to be difficult for a frame rate to increase in speed. A display system for achieving both a decrease of a VAC and an increase in speed has not so far existed.

CITATION LIST

Patent Literature

Patent Literature 1
International Publication No. WO 2014/062912
Patent Literature 2
International Publication No. WO 2017/112084
Patent Literature 3
U.S. Patent Application Publication No. 2017/0184848

Non-Patent Literature

Non-Patent Literature 1
R. Jota, A. Ng, P. Dietz, and D. Wigdor, "How fast is fast enough?," in Proceedings of the SIGCHI Conference on Human Factors in Computing Systems—CHP13, 2013, p. 2291.
Non-Patent Literature 2
K. Okumura, H. Oku, and M. Ishikawa, "Lumipen: Projection-Based Mixed Reality for Dynamic Objects," 2012 IEEE Int. Conf. Multimed. Expo (ICME 2012), pp. 699-704, 2012.
Non-Patent Literature 3
G. Narita, Y. Watanabe, and M. Ishikawa, "Dynamic Projection Mapping onto Deforming Non-Rigid Surface Using Deformable Dot Cluster Marker," IEEE Trans. Vis. Comput. Graph., vol. 23, no. 3, pp. 1235-1248, March 2017.
Non-Patent Literature 4
F. Zheng et al., "Minimizing latency for augmented reality displays: Frames considered harmful," in ISMAR 2014—IEEE International Symposium on Mixed and Augmented Reality—Science and Technology 2014, Proceedings, 2014, pp. 195-200.
Non-Patent Literature 5
P. Lincoln et al., "From Motion to Photons in 80 Microseconds: Towards Minimal Latency for Virtual and Augmented Reality," IEEE Trans. Vis. Comput. Graph., vol. 22, no. 4, pp. 1367-1376, 2016.
Non-Patent Literature 6
Y. Itoh, J. Orlosky, K. Kiyokawa, and G. Klinker, "Laplacian Vision," in Proceedings of the 7th Augmented Human International Conference 2016 on—AH'16, 2016, pp. 1-8.
Non-Patent Literature 7
A. Maimone, D. Lanman, K. Rathinavel, K. Keller, D. Luebke, and H. Fuchs, "Pinlight displays," ACM Trans. Graph., vol. 33, no. 4, pp. 1-11, July 2014.
Non-Patent Literature 8
F.-C. Huang, K. Chen, and G. Wetzstein, "The light field stereoscope," ACM Trans. Graph., vol. 34, no. 4, pp. 60:1-60:12, July 2015.
Non-Patent Literature 9
R. Konrad, N. Padmanaban, E. Cooper, and G. Wetzstein, "Computational focus-tunable near-eye displays," 2016, pp. 1-2.
Non-Patent Literature 10
J.-H. R. Chang, B. V. K. V. Kumar, and A. C. Sankaranarayanan, "Towards Multifocal Displays with Dense Focal Stacks," vol. 37, no. 6, 2018.

Non-Patent Literature 11
Sheng Liu, Hong Hua, and Dewen Cheng, "A Novel Prototype for an Optical See-Through Head-Mounted Display with Addressable Focus Cues," IEEE Trans. Vis. Comput. Graph., vol. 16, no. 3, pp. 381-393, May 2010.
Non-Patent Literature 12
D. Dunn et al., "Wide Field of View Varifocal Near-Eye Display Using See-Through Deformable Membrane Mirrors," IEEE Trans. Vis. Comput. Graph., vol. 23, no. 4, pp. 1275-1284, 2017.
Non-Patent Literature 13
A. Maimone, A. Georgiou, and J. S. Kollin, "Holographic near-eye displays for virtual and augmented reality," ACM Trans. Graph., vol. 36, no. 4, pp. 1-16, July 2017.
Non-Patent Literature 14
N. Matsuda, A. Fix, and D. Lanman, "Focal surface displays," ACM Trans. Graph., vol. 36, no. 4, pp. 1-14, 2017.
Non-Patent Literature 15
T. Ueno and Y. Takaki, "Super multi-view near-eye display to solve vergence—accommodation conflict," Opt. Express, vol. 26, no. 23, p. 30703, November 2018.
Non-Patent Literature 16
S.-B. Kim and J.-H. Park, "Optical see-through Maxwellian near-to-eye display with an enlarged eyebox," Opt. Lett., vol. 43, no. 4, p. 767, 2018.
Non-Patent Literature 17
A. Mermillod-Blondin, E. McLeod, and C. B. Arnold, "High-speed varifocal imaging with a tunable acoustic gradient index of refraction lens," Opt. Lett., vol. 33, no. 18, pp. 2146-2148, 2008.

BRIEF SUMMARY

Technical Problem

In view of the foregoing circumstances, the inventors have conducted studies on a display principle capable of presenting a three-dimensional light ray field, which has solved a VAC, at high speed.

Considering a display principle that matches focusing of eyes, the display principle is roughly classified into three methods. The first method is a so-called volumetric display principle (see Patent Literatures 1 to 3, described above), and is a method for presenting different video images while optically scanning a depth position of a display conjugate image (i.e., while changing the depth position). The second method is a method for generating light as a wavefront including a phase by CGH (computer generated holography). The third method is based on a light field, and is used for generating a light ray field in both each of coordinates and a direction in a space.

Although the methods respectively have advantages and disadvantages, the above-described second and third methods each have a problem that a calculation amount is relatively large when considered for the purpose of generating a video image at high speed. In comparison, a volumetric display principle enables a video image to be generated in a relatively simple calculation, and may be suitable for an increase in speed.

The present disclosure has been made in view of the foregoing circumstances. A principal aspect of the present disclosure is to provide a volumetric display capable of high-speed image presentation.

Solution to Problem

Embodiments of the disclosure for solving the above-described problem can be described by way of example in the following items.

Item 1
A volumetric display including
an image projector and a resonance-type liquid lens, in which
a focal length of the resonance-type liquid lens is periodically adjusted using resonance of a liquid,
the image projector is configured to project an image toward a viewpoint position of a user via the resonance-type liquid lens, and
the image projector is configured to project the image within a shorter time period than one-tenth of a variation cycle of the focal length.

Item 2
The volumetric display as described in item 1, in which
the image projector includes a light emitter and a display element,
the display element is configured to form the image, and
the light emitter is configured to irradiate the display element with light to project the image formed on the display element toward the viewpoint position.

Item 3
The volumetric display as described in item 2, in which
the light emitter includes an LED that emits the light, and
the display element is composed of a DMD.

Item 4
The volumetric display as described in item 2 or item 3, further including
a control unit,
in which the control unit is configured to control a light emission timing of the light emitter depending on a focal position of an image to be presented to the user.

Item 5
The volumetric display as described in any one of items 1 to 4, further including
a half mirror,
in which the image that has been transmitted by the resonance-type liquid lens is configured to be projected onto the viewpoint position of the user via the half mirror.

Advantageous Effect of the Disclosure

According to the present disclosure, there can be provided a volumetric display capable of high-speed image presentation.

DETAILED DESCRIPTION

Figure 1:
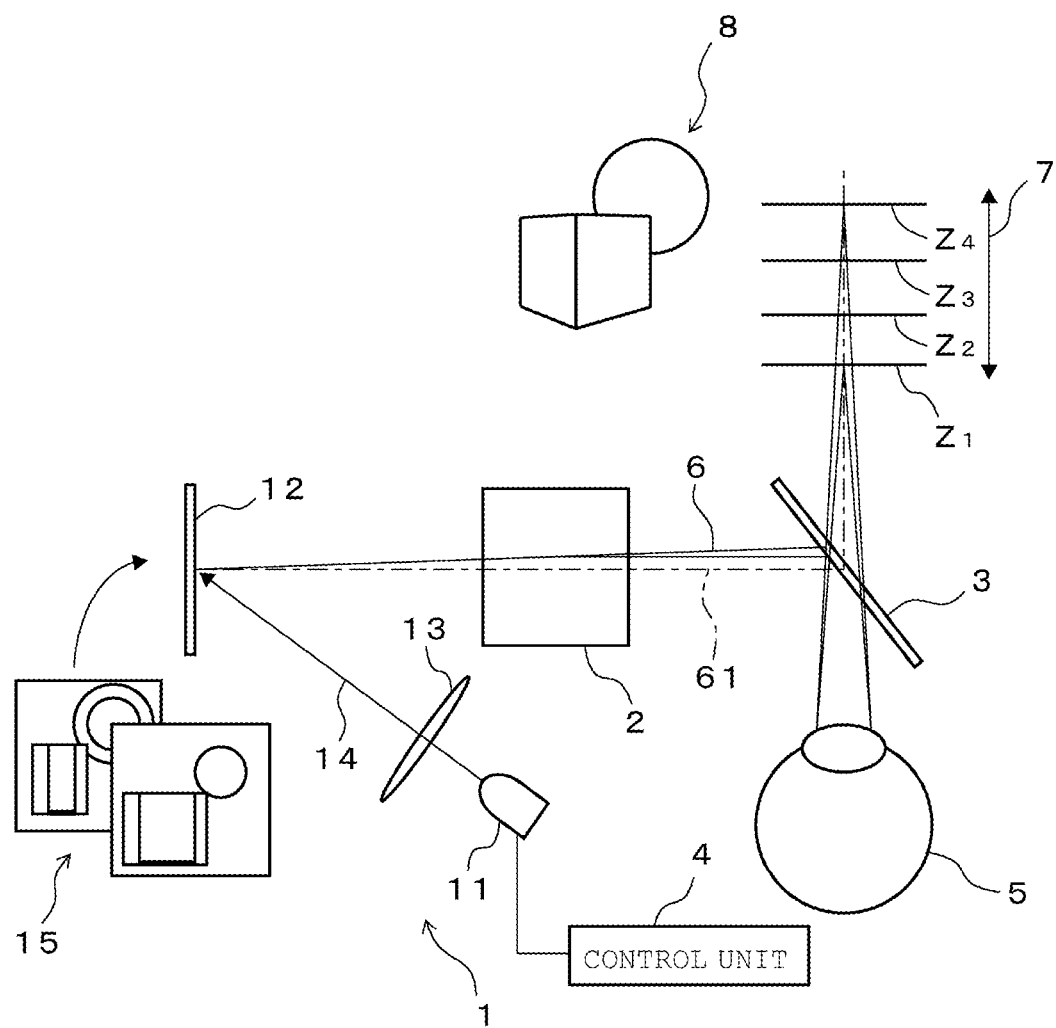
FIG. 1 is a diagram illustrating a schematic configuration of a volumetric display according to an embodiment of the present disclosure.

A volumetric display according to an embodiment of the present disclosure will be described below with reference to FIG. 1.

The volumetric display according to the present embodiment includes an image projector 1 and a resonance-type liquid lens 2, respectively, as main components. Further, the volumetric display includes a half mirror 3 and a control unit (e.g., controller) 4, respectively, as additional elements.

Resonance-Type Liquid Lens

A focal length of the resonance-type liquid lens 2 is periodically adjusted using resonance of a liquid. More specifically, a TAG (tunable acoustic gradient index) lens is used as the resonance-type liquid lens 2 in the present embodiment.

The TAG lens will be described below. The TAG lens is one type of liquid lens, the focal length of which can be vibrated at a frequency from several tens of kilohertz to several hundreds of kilohertz (see Non-Patent Literature 17, described above). This device excites resonance of a compressional wave (ultrasonic wave) axially symmetric to a transparent liquid sealed into a cylindrical container, and uses an axially symmetric refractive index distribution to be generated by the resonance as a lens. The refractive index distribution is generated because a refractive index of a material depends on a density of the material. When an appropriate vibration mode is selected, the refractive index distribution is simple harmonic motion having an axially symmetric Bessel function as an amplitude, and is a distribution close to a paraboloidal surface in the vicinity of an optical axis. The TAG lens continues to vibrate between a convex lens and a concave lens because the height of the refractive index distribution vibrates with time. The cycle of the vibration is a natural frequency of the compressional wave. The cycle of the vibration also depends on the size of the lens and a physical value of the liquid. However, a natural vibration frequency from several tens of kilohertz to several hundreds of kilohertz is obtained by a palm-sized device. Thus, very high-speed vibration of the focal length can be obtained. As the resonance-type liquid lens, a TAG lens commercially available from TAG Optics Inc., for example, can be used. Although a TAG lens refractive power of which vibrates in a range from −1[dpt=1/m] to 1 [dpt] at a natural vibration frequency of 69 kHz is assumed as the TAG lens in the present embodiment, the TAG lens is not limited to this.

Image Projector

The image projector 1 is configured to project an image toward a viewpoint position 5 (see FIG. 1) of a user via the resonance-type liquid lens 2.

More specifically, the image projector 1 in the present embodiment includes a light emitter 11, a display element 12, and a condenser lens 13.

The display element 12 is configured to form an image to be projected toward the user. More specifically, the display element in the present embodiment is composed of a DMD (digital micromirror device).

The light emitter 11 is configured to irradiate the display element 12 with light to project an image formed on the display element 12 toward the viewpoint position 5 of the user. More specifically, the light emitter 11 in the present embodiment includes an LED that emits light to be irradiated toward the display element 12. A light ray from the light emitter 11 is denoted by reference numeral 14 in FIG. 1.

The light emitter 11 is configured to irradiate light toward the display element 12 within a shorter time period (i.e., in a shorter time slot) than one-tenth of a variation cycle of the focal length of the resonance-type liquid lens 2. As a result, in the present embodiment, an image to be projected toward the user can be projected within a shorter time period than one-tenth of the variation cycle of the focal length. This point will be described below as an operation of a display.

In FIG. 1, a schematic image to be formed on the display element 12 is denoted by reference numeral 15, and a flux of light rays for forming an image by the display element 12 is denoted by reference numeral 6. Reference numeral 61 denotes a main axis direction of the flux of light rays 6.

Condenser Lens

The condenser lens 13 condenses light from the light emitter 11, and sends the light to the display element 12. Although a single lens is used as the condenser lens 13 in an example illustrated in FIG. 1, the condenser lens 13 can also be configured to exhibit a required function by a combination of a plurality of lenses.

Half Mirror

The half mirror 3 is arranged at a position where an image that has been transmitted by the resonance-type liquid lens 2 can be reflected toward the viewpoint position 5 of the user. That is, in the present embodiment, the half mirror 3 is configured such that the image that has been transmitted by the resonance-type liquid lens 2 is projected onto the viewpoint position 5 of the user via the half mirror 3.

The half mirror 3 transmits light from the exterior to send the light to the viewpoint position of the user. As a result, a projected image can be superimposed on an external image (e.g., an image in a real space).

Control Unit

The control unit 4, which may be a controller, is configured to control a light emission timing of the light emitter 11 (specifically, an LED) depending on the focal position of an image to be presented to the user. The control unit 4 can be configured by appropriate computer hardware or computer software or their combination. A detailed operation of the control unit 4 will be described below.

Operation in Present Embodiment

Then, an operation of the volumetric display according to the present embodiment will be described with further reference to FIG. 2.

Basic Operation

First, the resonance-type liquid lens 2 is resonated, to vary the focal length thereof. As a result, an image-forming position of an image to be projected toward the user from the resonance-type liquid lens 2 also changes. The change of the image-forming position is illustrated in FIG. 2(*a*). Typically, the image-forming position changes in a sinusoidal shape, but is not limited to this. If the frequency of the TAG lens to be used as the resonance-type liquid lens 2 is 69 kHz, a variation cycle T of the image-forming position is approximately 14.5 microseconds. However, the variation cycle T is not limited to this numerical value.

The variation cycle T of the image-forming position is generally faster than a frame cycle of a current display commercially available. Although the DMD is one of displays each having a fastest frame rate, for example, the frame rate of the DMD is limited to approximately 32,000 frames per second, and a frame cycle of the DMD is approximately 31.3 microseconds. When an image having this frame rate is directly incident on the resonance-type liquid lens 2, the image-forming position (i.e., the focal length) varies by substantially two cycles during one frame. Therefore, an image cannot be presented in a specific focal length.

Figure 2:
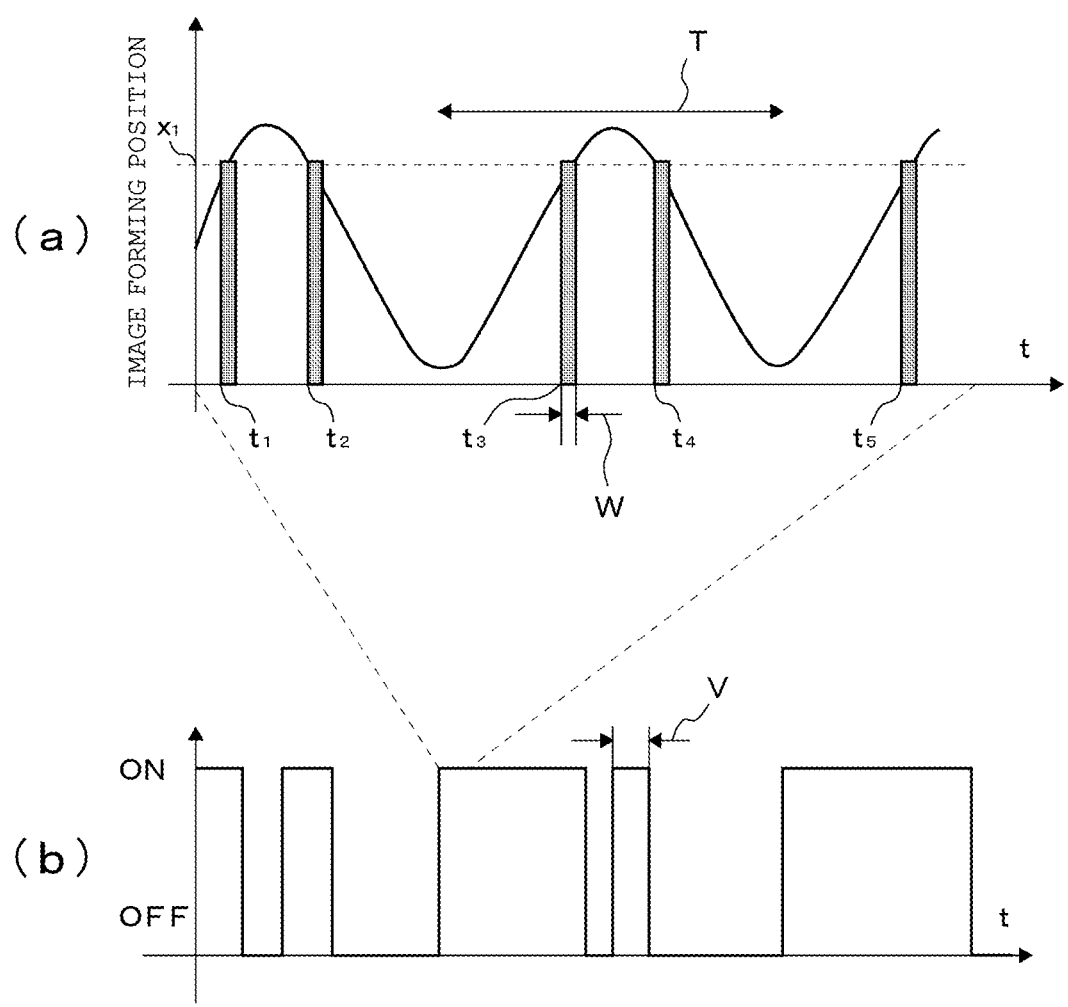
FIG. 2(a) schematically illustrates a relationship between an image-forming position and a light emission timing of an LED, where a horizontal axis represents a time (ns) and a vertical axis represents an image-forming position (arbitrary unit).
FIG. 2(b) schematically illustrates an ON/OFF timing of a digital micromirror device (DMD), where a horizontal axis represents a time (μs) and a vertical axis represents ON/OFF.

The light emitter 11 in the present embodiment irradiates light toward the display element 12 within a shorter time period than one-tenth of the variation cycle T (see FIG. 2(*a*)) of the focal length of the resonance-type liquid lens 2. More specifically, in the present embodiment, the LED of the light emitter 11 is made to emit light within a time period W (see FIG. 2(*a*)) of approximately 500 ns or less. A light emission timing from the light emitter 12 is controlled by the control unit 4 in this example.

For example, the light emitter 11 is made to emit light for only a time period W at a time $t_1$ in FIG. 2 (see FIG. 2(*a*)). As a result, an image can be presented to the user at a specific image-forming position $x_1$ (see FIG. 2(*a*)) substantially (i.e., in a human sense).

Further, if the light emitter 11 is made to emit light at a time $t_2$ to a time $t_n$ (up to a time $t_5$ in FIG. 2(*a*)) corresponding to the same image-forming position $x_1$ within a time interval V (e.g., 31 microseconds; see FIG. 2(*b*)) of one frame, the same image at the same image-forming position can be intermittently presented to the user in a short time interval. As a result, there is an advantage that a bright image can be presented to the user.

If a three-dimensional image is presented to the user, an image corresponding to an image-forming position (i.e., a depth) is presented to the user during one frame. In this case, if the light emitter 11 is made to emit light at a time $t_i$ corresponding to an image-forming position $x_i$ of the three-dimensional image, an image at the image-forming position can be presented. For example, FIG. 1 schematically indicates that a virtual image can be displayed at specific positions (virtual image positions corresponding to the image-forming position) $z_1$ to $z_4$. Further, FIG. 1 schematically illustrates a variation range 7 of a display position of the virtual image. The positions and the range are merely illustrative, and are not limited to these.

In this manner, the three-dimensional image can be presented to the user. A schematic example of the three-dimensional image is denoted by reference numeral 8 in FIG. 1. A position where the three-dimensional image appears is within the variation range 7 of the position of the virtual image. As described above, the light emitter 11 is made to emit light such that a plurality of images can be presented at the same image-forming position during one frame so that a bright image can be presented to the user.

In the present embodiment, a projected image is presented to the user via the half mirror 3. Thus, the user can visually recognize an image obtained by superimposing the projected image on an external image (e.g., an image in a real space) can be visually recognized. Therefore, a technique in the present embodiment can contribute to implementation of AR and MR.

Example

A more specific example will be described below on the premise of the foregoing description. Hereinafter, it is indicated that one volume (i.e., one three-dimensional image) can be presented within one millisecond.

Considering that the frame rate of the DMD is set to 32,000 frames per second and the three-dimensional image is presented at a rate of 1,000 volumes per second, a maximum of 32 frames of the DMD can be assigned to the presentation of the one volume.

Considering that a monochrome image with a 1-bit gradation is presented, separate images can be presented in 32 stages in a depth direction. That is, a three-dimensional image having depth information in 32 stages can be presented to the user at a rate of 1,000 volumes per second.

Consider a display of a monochrome screen with a 3-bit gradation by increasing the gradation of the image. Therefore, seven (=1+2+4) frames of the DMD are required to present one image. In an example in which images in the first to fourth stages in the depth direction are presented, 7×4=28 frames are required. The number of frames are less than 32 frames. Accordingly, a configuration in the present embodiment indicates that one three-dimensional image having gradation representation can be presented to the user within one millisecond.

FIG. 2(*b*) illustrates an example illustrating an operation representing a gradation by ON/OFF of the DMD. As is well known, gradation representation can be performed by switching ON and OFF of each micro mirror in the DMD. If a frame cycle V of the DMD is 31 microseconds, for example, ON/OFF switching of the micro mirror is constant during the frame cycle. When the light emitter is operated, as illustrated in FIG. 2(*a*), during the frame cycle, as described above, an image at a specific image-forming position can be presented to the user. Therefore, in the above-described example, a stereoscopic image a display content of which has been updated can be presented to the user every one-thousandth of a second. Note that FIG. 2 is only schematic and a scale of FIG. 2(*a*) and a scale of FIG. 2(*b*) are not strict.

Aspects of the present disclosure are not limited to the above-described embodiment. The present disclosure contemplates various changes for specific configuration within a range described in the claims.

Although in the above-described embodiment, the light emitter 11 using the LED and the display element 12 using the DMD are used to constitute the image projector 1, for example, the image projector 1 is not limited to this. For example, the LED can also be replaced with a light emitting element capable of controlling a light emission time period at a speed approximately equal to or higher than that of the LED. For example, devices such as an OLED, a μLED, and an LED array can also be used as the image projector. However, the respective frame rates of the devices are preferably sufficiently high. That is, projection can preferably be performed in a short time interval corresponding to a specific image-forming position.

Further, although an image (virtual image) is presented to the user using the half mirror 3 in the above-described embodiment, a half mirror need not be used. When an image focused by the resonance-type liquid lens 2 is projected onto the eyes of the user directly or via any optical system, for example, an image (virtual image) can also be presented to the user.

Further, in the above-described embodiment, the image projector 1 is configured to project an image within a shorter time period than one-tenth of the variation cycle of the focal length of the resonance-type liquid lens 2. However, an image projection time period can be a shorter time period than one-tenth of the variation cycle of the focal length, e.g., one twentieth or one-thirtieth of the variation cycle of the focal length. The shorter the image projection time period is, the more precise a three-dimensional image to be presented may be. If the image projection time period is short, a stereoscopic image may be dark. However, when projection is performed a plurality of times at the same focal position, a bright stereoscopic image can be presented to the user.

REFERENCE SIGNS LIST

1 Image projector
11 Light emitter
12 Display element
13 Condenser lens
14 Light ray
15 Presented image 2 Resonance-type liquid lens
3 Half mirror
4 Control unit (controller)
5 Viewpoint position (user's eye)
6 Flux of light rays
61 Main axis direction
7 Variation range of virtual image
8 Three-dimensional image The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A volumetric display comprising:
an image projector; and
a resonance-type liquid lens, wherein:
    a focal length of the resonance-type liquid lens is periodically adjusted using resonance of a liquid,
    the image projector is configured to project an image toward a viewpoint position of a user via the resonance-type liquid lens, and
    the image projector is configured to project the image within a shorter time period than one-tenth of a variation cycle of the focal length.

2. The volumetric display according to claim 1, wherein:
the image projector includes a light emitter and a display element,
the display element is configured to form the image, and
the light emitter is configured to irradiate the display element with light to project the image formed on the display element toward the viewpoint position.

3. The volumetric display according to claim 2, wherein:
the light emitter includes an LED that emits the light, and
the display element is composed of a digital micromirror device (DMD).

4. The volumetric display according to claim 2, further comprising:
controller,
wherein the controller is configured to control a light emission timing of the light emitter depending on a focal position of an image to be presented to the user.

5. The volumetric display according to claim 1, further comprising:
a half mirror,
wherein the image that has been transmitted by the resonance-type liquid lens is configured to be projected onto the viewpoint position of the user via the half mirror.

* * * * *